(12) United States Patent
Yamasaki et al.

(10) Patent No.: US 7,239,795 B2
(45) Date of Patent: Jul. 3, 2007

(54) PICTURE DATA REPRODUCING APPARATUS AND METHOD

(75) Inventors: Kenji Yamasaki, Kanagawa (JP); Yasuhiro Goto, Kanagawa (JP); Fumiyoshi Abe, Kanagawa (JP); Munehiro Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 10/619,271

(22) Filed: Jul. 14, 2003

(65) Prior Publication Data

US 2004/0091245 A1   May 13, 2004

(30) Foreign Application Priority Data

Jul. 15, 2002   (JP)   ............................. 2002-206119

(51) Int. Cl.
*H04N 5/91* (2006.01)
*H04N 7/26* (2006.01)

(52) U.S. Cl. ........................................ 386/68; 386/111
(58) Field of Classification Search ................. 386/68, 386/6–8, 111–112, 33; 375/240.12–240.16, 375/240.24; 348/423.1
See application file for complete search history.

(56) References Cited

U.S. PATENT DOCUMENTS 6,396,874 B1 *   5/2002   Kato ...................... 375/240.16

* cited by examiner

*Primary Examiner*—Thai Q. Tran
*Assistant Examiner*—Tat Chi Chio
(74) *Attorney, Agent, or Firm*—Frommer Lawrence & Haug LLP; William S. Frommer

(57) ABSTRACT

In an STC generating step, STCs (STC_d) delayed a time "System_delay" from STC (STC_medium) in compressed picture data read from a recording medium in the normal-speed reproduction mode is sequentially generated. In this STC generating step, there is set at shift from a variable-speed reproduction to normal-speed reproduction an STC initial value on the basis of results of comparison between PTS (PTS_s) in display picture data at the time of reproduction mode shift and {STC_medium at the shift−(delay due to the shift (shift_delay)+System_delay)}. Thus, when shifting the reproduction mode from a variable-speed one to normal-sped one in compliance with the MPEG standard, pictures can smoothly be displayed in the normal-speed reproduction mode without skipping over any displayed pictures.

12 Claims, 8 Drawing Sheets

PICTURE DATA REPRODUCING APPARATUS AND METHOD

BACKGROUND OF THE INVENTION

1. Field of the Invention

The present invention relates to a picture data reproducing apparatus and method, usable suitably for reproducing picture data coded according to the MPEG (Moving Picture Experts Group) standard by decoding the data.

This application claims the priority of the Japanese Patent Application No. 2002-206119 filed on Jul. 15, 2002, the entirety of which is incorporated by reference herein.

2. Description of the Related Art

Recently, various digital video coding techniques as typified by MPEG-2 (ISO/IEC 13818) have been proposed to compress a video by coding. The video compression according to the MPEG standard is such that a signal produced by effecting a hybrid transform which is a combination of inter-picture motion compensation and DCT (discrete cosine transform) undergoes quantization and variable-length coding.

According to the MPEG standard, picture planes (frames or fields) included in a video are compressed by coding them into any one of picture types including I, P and B pictures. The I picture is an intra-frame predictive coded picture or an intra coded picture. It is a picture predictively coded in one frame. The P picture is a frame forward-predictive coded picture or a predictive coded picture. It is a picture predicted by referring to a previous frame (I or P picture) which is already coded. The B picture is a bidirectionally predictive coded picture or a bidirectional coded picture. It is a picture predicted by referring to two frames, namely, a previous one and later one.

As above, according to the MPEG standard, video compression is done by inter-picture predictive coding, whereby it is made possible to efficiently compress a video and access the compressed video at random. Also, according to the MPEG standard, pictures of each of the above types are compressed into a data stream formed in units of a group of pictures (GOP) including an arbitrary number of pictures. The MPEG standard prescribes that at least one I picture should be included in a GOP to make it possible to make random access to a video compressed in units of GOP.

Note here that the MPEG-defined technique is not advantageous in that in case data is reproduced at a half, quarter, . . . , of a normal speed or in case a so-called variable-speed reproduction including frame advance and the like is shifted to the normal-speed reproduction, a skip is made over a picture being displayed due to the speed changing. Also, since picture cannot be displayed at the normal speed before reproduction of a recording medium is completely shifted to the one at the normal speed, shifting of the variable-speed reproduction to the desired normal-speed reproduction takes a long time before the user can actually view a video reproduced at the desired speed.

OBJECT AND SUMMARY OF THE INVENTION

It is therefore an object of the present invention to overcome the above-mentioned drawbacks of the related art by providing a picture data reproducing apparatus and method, in which normal speed-reproduced picture can smoothly be displayed without skipping over any picture being displayed in case variable-speed reproduction is shifted to normal-speed reproduction when picture data compressed according to the MPEG standard is being reproduced.

The above object can be attained by providing a picture data reproducing apparatus which reproduces compressed picture data recorded to a recording medium according the MPEG standard, the apparatus including according to the present invention:

a storage means for storing compressed picture data read from a recording medium;

an STC generating means for generating, for a normal-speed reproduction, STC (STC_d) sequentially from a set initial value, wherein the STC (STC_d) is delayed a fixed time (System_delay) from STC (STC_medium) of the compressed picture data read from the recording medium;

a read control means for sequentially reading compressed picture data stored in the storage means on the basis of STC_d generated by the STC generating means; and a decoding means for decoding the compressed picture data read by the read control means to generate picture data for display;

the STC generating means setting, at shift from a variable-speed reproduction to normal-speed reproduction, the initial value on the basis of a result of comparison between PTS (PTS_s) of the display picture data at the shift and STC_medium at the shift−(amount of delay due to the shift (shift_delay)+System_delay).

Also the above object can be attained by providing a picture data reproducing method of reproducing compressed picture data recorded to a recording medium according the MPEG standard, the method including, according to the present invention, the steps of:

storing compressed picture data read from a recording medium;

generating, for a normal-speed reproduction, STC (STC_d) sequentially from a set initial value, wherein the STC (STC_d) is delayed a fixed time (System_delay) from STC (STC_medium) of the compressed picture data read from the recording medium;

sequentially reading compressed picture data stored in the storage means correspondingly STC_d generated by the STC generating means; and decoding the compressed picture data read by the read control means to generate picture data for display;

in the STC generating step, the initial value being set at shift from a variable-speed reproduction to normal-speed reproduction on the basis of a result of comparison between PTS (PTS_s) of the display picture data at the shift and STC_medium at the shift−(amount of delay due to the shift (shift_delay)+System_delay).

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The embodiment of the present invention will be described in detail below with reference to the accompanying drawings.

Figure 1:
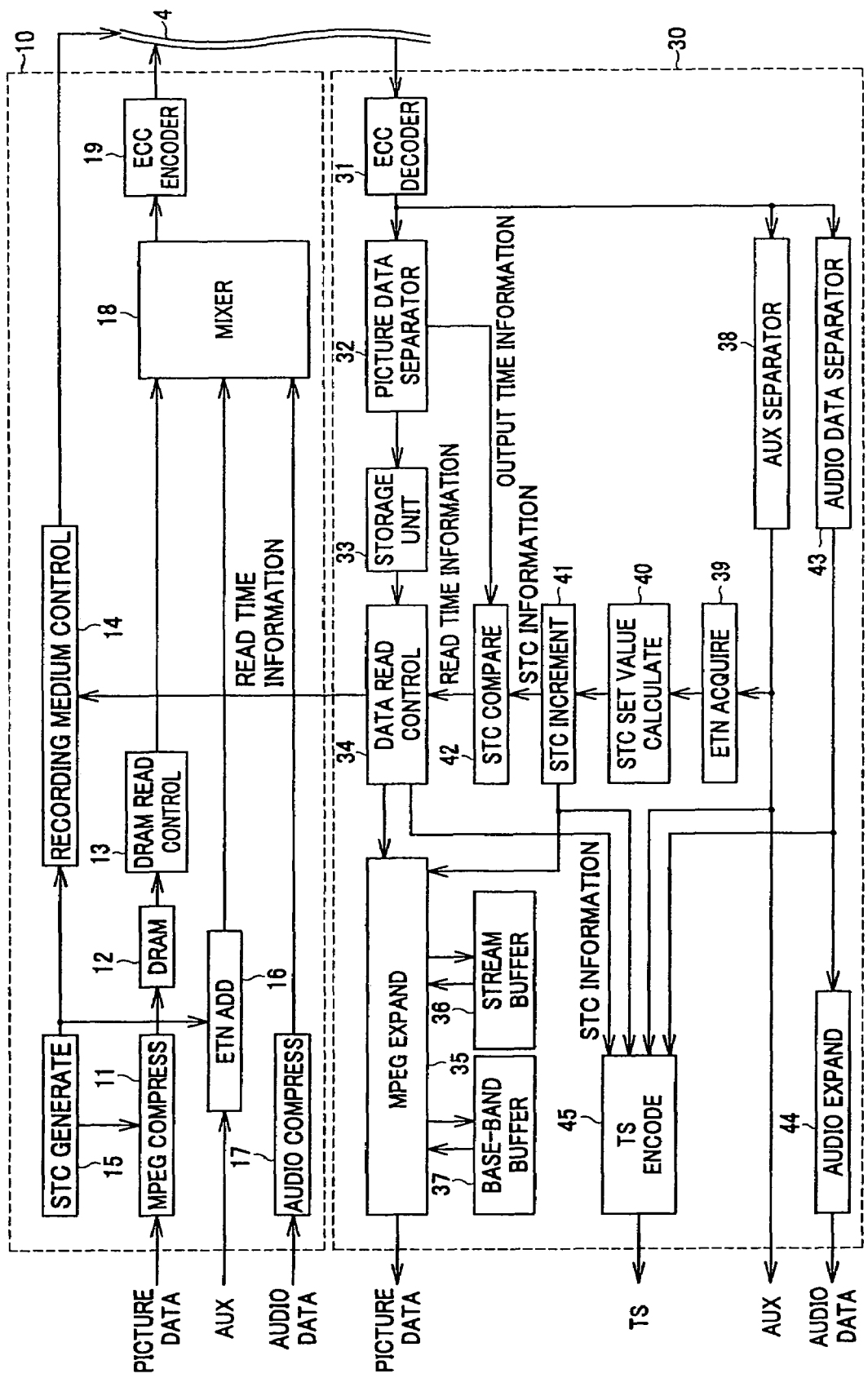
FIG. 1 shows the construction of a recorder/player according to the present invention.

The picture data reproducing apparatus according to the present invention is applied to a picture recorder/player, indicated with a reference 1, which records picture data to a recording medium according to the MPEG (Moving Picture Experts Group) standard defining a highly efficient compression coding of motion pictures or reproduces the motion picture data from the recording medium. As shown in FIG. 1, the picture recorder/player 1 includes a recording system 10 which records compressed picture data to a recording medium 4, and a reproduction system 30 which expands or decompresses the picture data read from the recording medium 4. It should be noted that the recording medium 4 is a magnetic tape or disc intended to record picture and audio data, for example.

The recording system 10 includes an MPEG compressor 11, DRAM 12, DRAM read controller 13, recording medium controller 14, STC (system time clock) generator 15, ETN (extended track number) adder 16, audio compressor 17, mixer 18 and an ECC (error correction code) encoder 19.

The MPEG compressor 11 generates compressed picture data by encoding input picture signals by compression on the basis of coded parameters such as a picture type, quantization step, etc. on the basis of STC supplied from the STC generator 15. The MPEG compressor 11 sends the generated compressed picture data to the DRAM 12.

The DRAM 12 stores the compressed picture data sent from the MPEG compressor 11. The DRAM read controller 13 reads the compressed picture data from the DRAM 12 and supplies it to the mixer 16 in a predetermined timing.

The recording medium controller 14 is provided to control the driven state of the recording medium 4. In case the recording medium 4 is a magnetic tape, for example, the recording medium controller 14 is equivalent to a servo controller. The recording medium controller 14 can control the recording medium 4 to record or reproduce various kinds of data at the normal speed and also can freely control the recording medium 4 correspondingly to a selected speed in the so-called variable-speed reproduction in which data is reproduced at a half or quarter, . . . , of the normal speed, frame is advanced or any other operation is done at a variable speed. The recording medium controller 14 generates ETN (extended track number) that is recording position information in the recording medium 4 on the basis of read time information received from the reproduction system 30 and which will be described in detail later, and sends it to the STC generator 15 and ETN adder 16.

The STC generator 15 generates STC (system time clock) on the basis of ETN supplied from the recording medium controller 14, and supplies it to the MPEG compressor 11. It should be noted that ETN is a number of tracks counted from the beginning in the recording medium 4. In a system whose field frequency at a rate 10 tracks/frame is 59.94 Hz, for example, STC is represented by ETN×300.3. That is, recording ETN simultaneously with recording of data to the recording medium is substantially equivalent to recording STC. At the time of reproduction, STC can be reproduced on the basis of the recorded STN.

The ETN adder 16 adds ETN sent from the recording medium controller 14 to auxiliary data (AUX) recorded to the recording medium 4, and supplies the data to the mixer 18.

The audio compressor 17 generates compressed audio data by encoding input audio signals by compression. The MPEG compressor 11 supplies the compressed audio data to the mixer 18.

The mixer 18 allocates the input compressed picture data, compressed audio data and AUX in an order of recording to the recording medium 4, and supplies the data to the ECC encoder 19. The ECC encoder 19 adds ECC (error correction code) to the data stream received from the mixer 18, and records the data to the recoding medium 4, for example, to a magnetic tape rotated on a rotating drum via a magnetic head (both not shown).

As shown, the reproduction system 30 includes an ECC decoder 31, picture data separator 32, storage unit 33, data read controller 34, MPEG expander 35, steam buffer 36, base-band buffer 37, AUX separator 38, ETN acquisition unit 39, STC set value calculator 40, STC incrementation unit 41, STC comparator 42, audio data separator 43, audio expander 44 and a TS encoder 45.

The ECC decoder 31 reads data stream from the recording medium 4, and removes ECC added to the read data stream.

The picture data separator 32 selectively reads the compressed picture data from the ECC decoder 31, and sends the data to the storage unit 33. Also, the picture data separator 32 analyzes PES (packetized elementary stream) header in the read compressed picture data to read DTS (decoding time stamp), PTS (presentation time stamp) and VBV (video buffering verifier) delay, generates output time information including an STC time, that is to be read fro each picture, and sends the information to the STC comparator 42.

The storage unit 33 stores the compressed picture data sent from the picture data separator 32 at predetermined addresses, respectively. The data read controller 34 reads, from the STC comparator 42, compressed picture data on pictures corresponding to an STC time included in the read time information sent from the STC comparator 42, and supplies the data to the MPEG expander 35, The MPEG expander 35 is supplied with the compressed picture data picture by picture from the data read controller 34, and receives STC information including STC concerning each input picture or GOP from the STC incrementation unit 41. The MPEG expander 35 makes MPEG expansion of each picture on the basis of STC in the received STC information to generate base-band picture signals. It should be noted that in the STD (system target decoder) system defined in MPEG-2, the expansion time shall ideally be set as zero (0). Since in any actual decoder, it is possible to set the expansion time as zero, however, the stream buffer 36 is provided additionally to the MPEG expander 35. The input compressed picture data from the data read controller 34 is first stored into the stream buffer 36, and then the compressed picture data is read from the stream buffer 36 in a timing of a predetermined STC sent from the STC incrementation unit 41 and sequentially expanded. It should be noted that additional compressed picture data may be supplied to the stream buffer 36 by the data read controller 34.

Note that the MPEG expander 35 stores the generated base-band picture signals in the base-band buffer 37 once, and further reorder them before delivery. It should be noted that the reason why the picture signals are stored into the base-band buffer 37 is that decoding a B picture needs reference to an I or P picture before and after the B picture.

The AUX separator 38 selectively reads AUX from the ECC decoder 31, delivers it to outside and sends it to the TS encoder 45. It should be noted that of AUX separated by the AUX separator 38, ETN is extracted by the ETN acquisition unit 39. The ETN acquisition unit 39 supplies the extracted ETN to the STC set value calculator 40.

The STC set value calculator 40 calculates an initial value of STC on the basis of ETN supplied from the ETN acquisition unit 39, and sends it to the STC incrementation unit 41. In a normal-speed reproduction, the STC incrementation unit 41 generates a new STC by linearly increasing the received initial value of STC, and sends it as the aforementioned STC information to the MPEG expander 35 and STC comparator 42.

The STC comparator 42 compares the output time information received from the picture data separator 32 and STC information received from the STC incrementation unit 41. The STC comparator 42 compares an STC time assigned to the output time information and STC assigned to the STC information, and when the result of comparison is that they coincide with each other, the STC comparator 42 sends the STC in consideration as read time information to the data read controller 34.

The data read controller 34 having received such a read time information can read only a picture at an STC time corresponding to STC set by the STC incrementation unit 41. In other words, STC information sent from the STC incrementation unit 41 permits the data read controller 34 to control a timing of reading each picture. Thus, by determining an initial value set by the STC incrementation unit 41, it is also possible to make decoding at a time delayed a predetermined time from the STC time recorded in the recording medium 4.

The audio data separator 43 selectively reads compressed audio data from the ECC decoder 31, and sends the data to the audio expander 44 and TS encoder 45. The audio expander 44 expands the compressed audio data received from the audio data separator 43 and provides the decompressed audio data as an output.

The TS encoder 45 receives the compressed picture data from the data read controller 34 and AUX from the AUX separator 38, and also receives the compressed audio data from the audio data separator 43 and STC information from the STC incrementation unit 41. The TS encoder 45 packetizes the received streams of compressed picture data, AUX, compressed audio data into transport streams (TS), and adds STC, PCR (program clock reference) and information necessary for TS, acquired from the received STC information, to the transport stream (TS). The TS encoder 45 delivers the packetized TS to outside.

The recorder/player 1 constructed as above functions as will be described below concerning a normal-speed reproduction:

First, the picture and audio data supplied to the recording system 10 are encoded by compression in the MPEG compressor 11 and audio compressor 17, and sent as compressed picture and audio data to the mixer 18. Also, AUX supplied to the recording system 10 has ETN added thereto and is similarly sent to the mixer 18. Since this ETN added to AUX matches STC used in the MPEG compressor 11, data can efficiently be allocated in the downstream mixer 18.

Figures 2A, 2B:
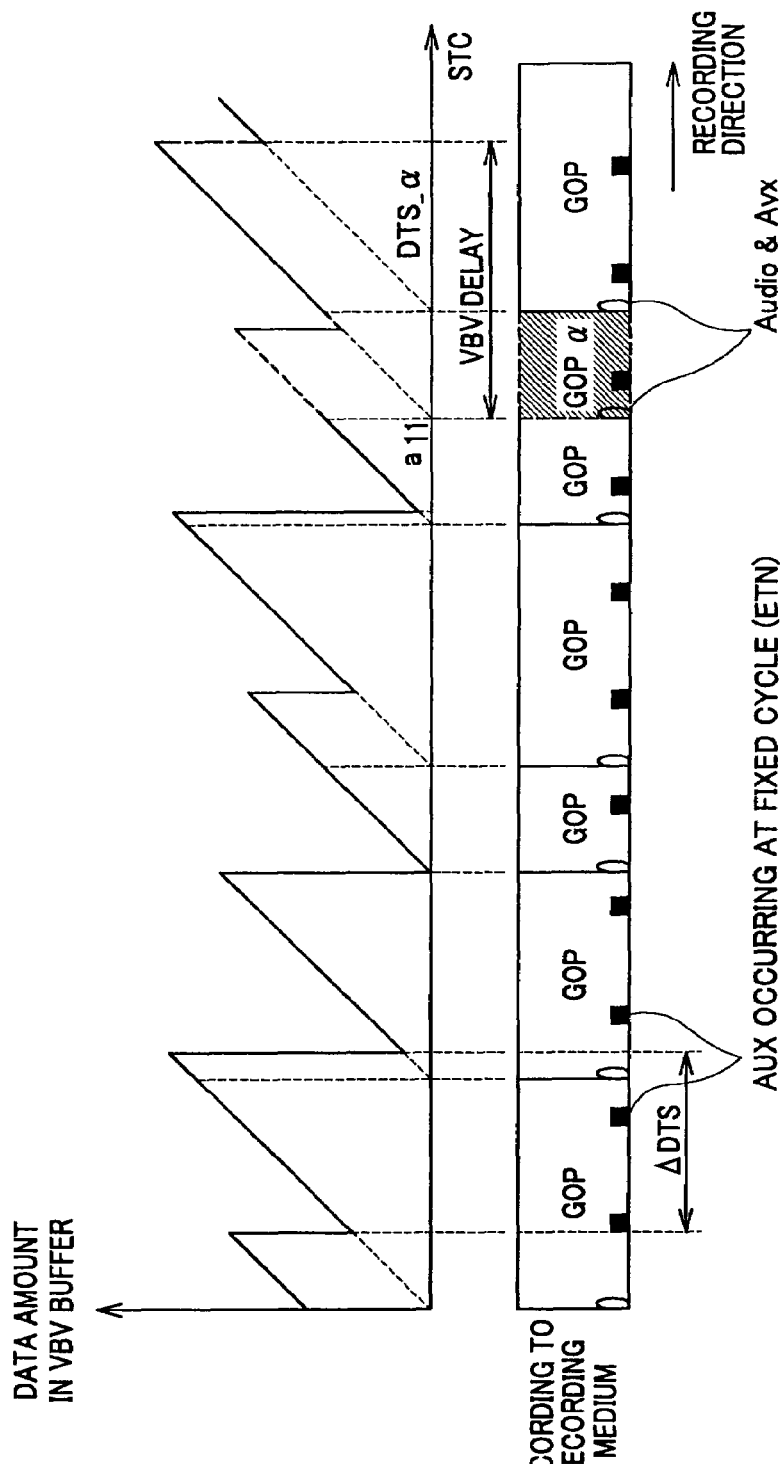
FIG. 2A and FIG. 2B show a relation between STC corresponding to a recording position and data amount in a VBV buffer.

FIG. 2B shows a data stream allocated by the mixer 18 in an order of the data recorded in the recording medium 4. The data stream recorded to the recording medium 4 is composed of groups of pictures (GOP) each consisting of an arbitrary number of pictures grouped according to the MPEG standard. In FIG. 2B, each of rectangular areas each including a GOP. As shown, GOPs are different in rectangular size from each other correspondingly to differences in data size from each other. In FIG. 2B, the elliptic area in each rectangular area records compressed audio data and AUX added to each GOP. The data amount in the elliptic area is extremely small in comparison with the compressed picture data. It should be noted that AUX to which auxiliary data including ETN and the like is added is also stored in a square area defined in each of the rectangular areas in fixed cycles irrespectively of the data size of GOP, as will be seen in FIG. 2B.

FIG. 2A graphically illustrates a relation between STC corresponding to the recording position shown in FIG. 2B and indicated along the horizontal axis and data amount in the VBV buffer indicated along the vertical axis. The VBV buffer is a virtual buffer assumed to always ascertain the data amount in the input buffer in the recording system 10. When each GOP is decoded, the data amount in the VBV buffer will suddenly be smaller. The decoding is done at fixed intervals ADTS which are an interval from one decoding management time to another.

In this connection, the dotted line in FIG. 2A indicates sequential storage of GOPα into the VBV buffer. In the course of storage, the data amount in the buffer suddenly falls in the data storage because GOP temporally preceding GOPα is decoded. GOPα is decoded at DTS (DTS_α) in a position indicated with a dashed line in FIG. 2A. A time from picture output time (a11) at which storage into the VBV buffer starts in GOPα to DTS_α is equivalent to VBV delay of the GOPα.

The above data stream has ECC thereof removed by the ECC decoder 31, and the compressed picture data is read by the picture data separator 32. Then, a picture output time is determined for each GOP or PES included in the compressed picture data by calculating DTS-VBV delay for each GOP or PES. The picture output time thus determined is sent as an STC time included in the aforementioned output time information to the STC comparator 42. Also, the compressed picture data is supplied to the storage unit 33.

The compressed picture data stored in the storage unit 33 is read by the data read controller 34 after it is delayed a predetermined time (System_delay) for time adjustment with respect to the audio signal or for matching with various timing codes added to AUX.

Figure 3:
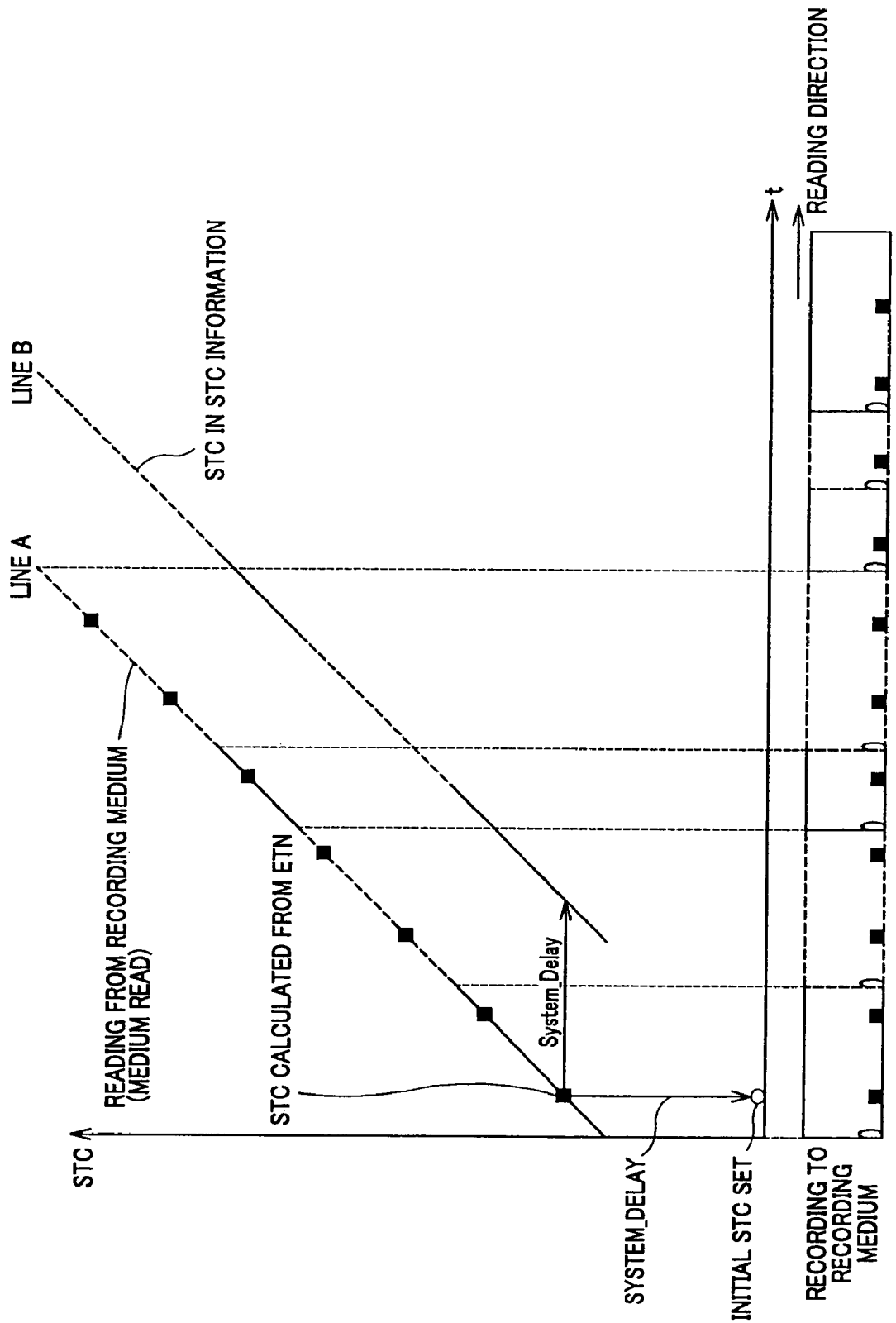
FIG. 3 shows a relation between STC read from a recording medium and STC generated by an STC incrementation unit.

In FIG. 3, a line A indicates STC calculated on the basis of ETN extracted from AUX read from the recording medium 4, and a horizontal axis t corresponding to the line A indicates a time when the compressed picture data is supplied to the storage unit 33.

To form a line B indicating the compressed picture data further delayed the time "System_delay" from the line A, the STC set value calculator 40 first sets STC delayed the time "System_delay" from the line A as an initial value and sends the data to the STC incrementation unit 41. The STC incrementation unit 41 can generate STC corresponding to the line B delayed the time "System_delay" from the line A by increasing the new STC linearly from the initial value of the received STC.

The STC incrementation unit 41 supplies the STC corresponding to the line B as STC information to the STC comparator 42, whereby it is possible to inhibit read time information from being sent until an STC time in the output time information delayed the time "System_delay" is reached. That is, the STC comparator 42 can send read time information delayed the time "System_delay" time from the STC time in the input output time information to the data read controller 34. Thereby, timing can freely be controlled by a simply constructed circuit.

The data read controller 34 reads the compressed picture data from the storage unit 33 according to the read control signal delayed the time "System_delay". Thus, the compressed picture data stored in the storage unit 33 can be delayed the time "System_delay" before being sent to the MPEG expander 35.

Note that the compressed picture data sent to the MPEG expander 35 is first additionally supplied to the stream buffer 36 in a predetermined timing, and then read from the MPEG expander 35 and expanded by the MPEG expander 35. The additionally supply of the compressed picture data to the stream buffer 36 will be described in detail later.

The STC corresponding to the line B formed by the STC incrementation unit 41 is sent as STC information to the STC comparator 42 and to the TS encoder 45 as well. So, the TS encoder 45 can create PCR from the STC and thus can directly TS-packetize each compressed picture data to be sent.

That is, at whichever position in the recording medium 4 the recorder/player 1 according to the present invention starts reading data, it can repeat an STC similar to that in the recording. It can make ECC coding of the STC by adding ETN to AUX. So, the data is higher reliable and also timing can be controlled with a high accuracy by setting a System_delay time corresponding to the reproduction system 30 at time of repeating the STC added to the recording medium 4.

Next, the operation of the stream buffer 36 when the normal-speed reproduction is shifted to a FORWARD variable-speed one will be described.

Figure 4:
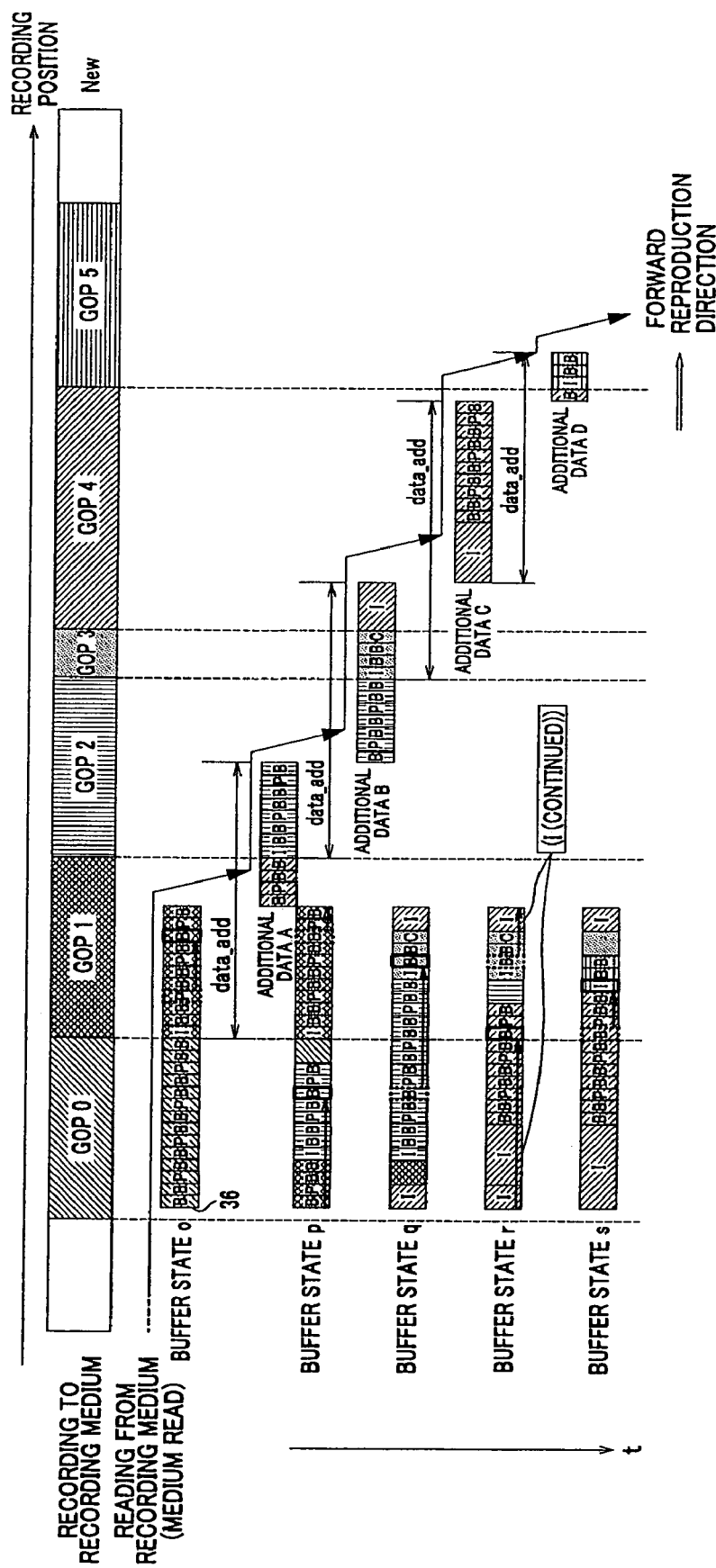
FIG. 4 explains operations made by a stream buffer when normal-speed reproduction is shifted to FORWARD variable-speed one.

FIG. 4 shows the stream buffer state before and after the shift to the FORWARD variable-speed reproduction. Data is recorded to the recording medium 4 in the direction of arrow indicated with "Recording position" in FIG. 4. GOPs different in data size from each other (namely, DOP0 to GOP5) are placed at recording positions, respectively, as shown. At the left end of FIG. 4, there are time-serially shown states o to s the stream buffer 36 takes when each picture in each GOP is read.

In this connection, the arrow with "Medium read" indicates a position in the recording medium 4 from which data is being read. Namely, in case the recording medium 4 is a magnetic tape for example, the position is a one on the magnetic tape at which the magnetic head is in contact with the latter.

It will be discussed here how the stream buffer 36 will operate when the normal-speed reproduction is shifted to a FORWARD variable-speed reproduction such as frame advance when the stream buffer 36 is in the state o where full GOP0 and a part of GOP1 have been stored in the stream buffer 36. At this time, pictures stored in the stream buffer 36 are sequentially read by the MPEG expander 35 for a FORWARD reproduction following the normal-speed reproduction. When pictures remaining in the stream buffer 36 counts three, new pictures are additionally stored into the latter. In the buffer state o, new pictures are additionally stored into the stream buffer 36 when B pictures shown each enclosed in a thick-line block and corresponding to the remaining three pictures are read by the MPEG expander 35.

The stream buffer 36 is supplied with a fixed amount (data_add) of additional pictures beginning at the head of a GOP including the third one of the three pictures remaining therein. Therefore, in case the stream buffer 36 is in the state o, it will be supplied with an additional amount (data_add) of pictures to the head of GOP1. Since a nearly half of GOP1 has already been stored in the stream buffer 36, however, the newly added picture will be an additional data A as shown in FIG. 4.

The stream buffer 36 may determine the additional amount (data_add) correspondingly to the capacity of the stream buffer 36 or as given by the following expression (1) taking a necessary margin in the system of the recorder/player 1:

$$\text{data\_add} = (\text{capacity of the stream buffer 36}) - (\text{necessary margin in the system}) \quad (1)$$

where the "necessary margin in the system" may be set as one ECC taking account of a margin of one ECC in a system in which the reproduction operation can be stopped only in one-ECC increments.

When it is detected that pictures have additionally been supplied up to the amount (data_add), the data read controller 34 will inform the recording medium controller 14 of that fact and cause the latter to stop reading of data stream from the recording medium 4. Also, the stream buffer 36 sequentially stores additional pictures first to next to the last picture written before supply of additional pictures as in a ring buffer. For example, when in the state o and having been supplied with additional data A first to next to the last B picture as in a ring buffer, the stream buffer 36 takes the state p. In this state p, the additional data A will sequentially be supplied to the stream buffer 36 first to the buffer left end following the last B picture.

Next, when the stream buffer 36 is in the state p, the MPEG expander 35 sequentially reads and expands pictures from the stream buffer 36 starting with a B picture corresponding to the third one of the remaining pictures, indicated with a dotted-line square in FIG. 4. Then, when the third remaining B picture indicated with the dotted-line square is read by the MPEG expander 35 with the stream buffer 36 being in the state p, the stream buffer 36 is supplied with additional data B. The amount of the additional data B is also the fixed stream amount (data_add) next to GOP2 including the third remaining B picture indicated with the dotted-line square. When the additional data B is supplied to the stream buffer 36 to next to the last B picture as in a ring buffer, the stream buffer 36 will take the state q.

Next, when the stream buffer 36 is in the state q, the MPEG expander 35 sequentially reads and expands pictures from the stream buffer 36 starting with a B picture corresponding to the third one of the remaining pictures, indicated with a dotted-line square in FIG. 4. Then, when the third remaining B picture indicated with the dotted-line square is read by the MPEG expander 35 with the stream buffer 36 being in the state q, the stream buffer 36 is supplied with additional data C. The amount of the additional data C is also the fixed stream amount (data_add) next to GOP3 including the third remaining B picture indicated with the dotted-line square. When the additional data B is supplied to the stream buffer 36 to next to the last B picture as in a ring buffer, the stream buffer 36 will take the state r.

The MPEG expander 35 reads pictures from the stream buffer 36 in the state r, and thus the stream buffer 36 is supplied with additional data D and will take the state s.

According to the present invention, the stream buffer 36 is repeatedly supplied with additional data for making the FORWARD variable-speed reproduction. Also, according to the present invention, the stream buffer 36 is sequentially supplied with additional data up to a fixed amount (data_add) first to the head of GOP. That is to say, in the stream buffer 36, an I picture is always stored at the head of each GOP. The I picture is indispensable for expansion of each picture included in the GOP. Thus, when the variable-speed reproduction direction shifts from FORWARD to REVERSE, the I picture in GOP which includes a picture to be expanded by the MPEG expander 35 at the time of expansion will always be stored in the stream buffer. Therefore, the MPEG expander 35 can instantaneously read and expand a picture stored in the stream buffer 36 without waiting for additional supply of new data to the stream buffer 36, thereby permitting to smoothly cope with various variations in the variable-speed reproduction.

Note that the operation made when the normal-speed reproduction is shifted to the FORWARD variable-speed reproduction is not limited to the above-mentioned one. In the above, when the pictures remaining in the stream buffer 36 count three, additional data is supplied to the stream buffer 36. For example, the operation may be such that when the remaining pictures in the stream buffer 36 count N (an arbitrary number), additional data is supplied to the stream buffer 36. In case the stream buffer has a large capacity, N may be set larger for gaining time for supply of additional data for the recording medium 4, whereby a high variable-speed and smooth reproduction can be done.

Also for a variable-speed reproduction, especially, for a high speed reproduction such as double-speed reproduction, the above embodiment can be implemented with appropriate skipping over pictures.

Figure 5:
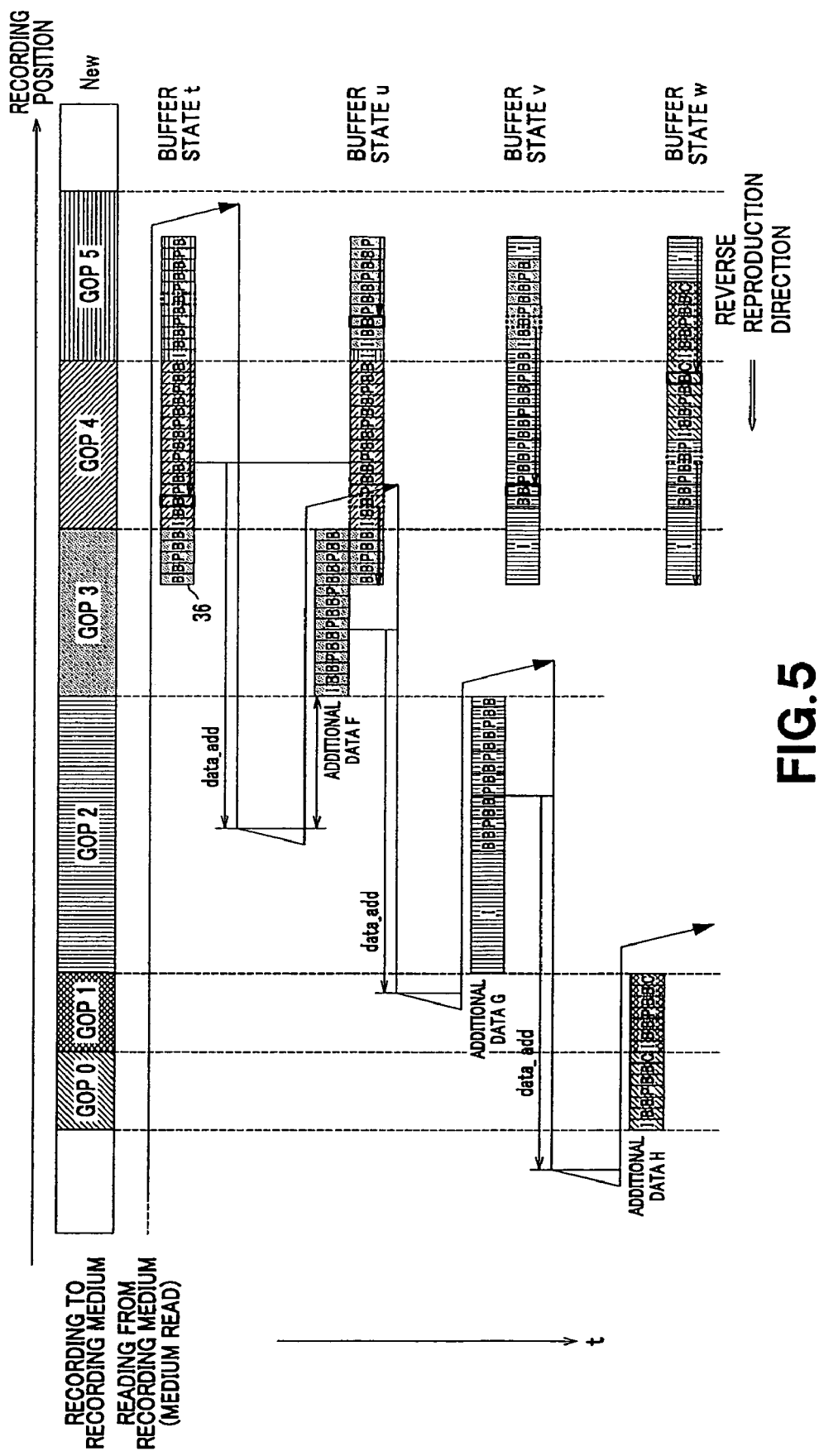
FIG. 5 explains operations made by the stream buffer when normal-speed reproduction is shifted to REVERSE variable-speed one.

When the normal-speed reproduction is shifted to REVERSE variable-speed reproduction, the stream buffer 36 operates as will be described below:

FIG. 5 shows the states of the stream buffer before and after shift to the REVERSE variable-speed reproduction. GOPs different in data size from each other (namely, DOP0 to GOP5) are placed at recording positions, respectively, in the recording medium 4 as shown. At the right end of FIG. 5, there are time-serially shown states t to w the stream buffer 36 takes when each picture in each GOP is read.

In this connection, the arrow with "Medium read" indicates a position in the recording medium 4 from which data is being read. In case the recording medium 4 is a magnetic tape for example, the position is a one on the magnetic tape at which the magnetic head is in contact with the latter.

It will be discussed here how the stream buffer 36 will operate when the normal-speed reproduction is shifted to a REVERSE variable-speed reproduction such as frame advance when the stream buffer 36 is in the state t where a part of GOP3, full GOP 4 and a part of GOP5 have been stored in the stream buffer 36. At this time, pictures stored in the stream buffer 36 are sequentially read by the MPEG expander 35 in the REVERSE direction opposite to a direction in the normal-speed reproduction in which pictures are read in the direction of an arrow-indicated recording position. For example, in case the normal-speed reproduction is shifted to a variable-speed reproduction while a B picture indicated with a dotted-line square is being read from the stream buffer 36 in the state t, data will be read in a reverse order from that B picture, a previous B picture, a P picture preceding the previous B picture, a B picture preceding the previous P picture, . . . .

It is defined here that a GOP of which all pictures currently stored provisionally in the stream buffer 36 in each of the stream buffer states is a current GOP. According to the present invention, pictures in such a current GOP in the stream buffer 36 count three, pictures in a GOP temporally preceding at least the current GOP are additionally supplied to the stream buffer 36.

For example, when the stream buffer 36 is in the state t for example, the current GOP of which all pictures are recorded in the stream buffer 36 is GOP4. When the pictures in the GOP4 in the stream buffer 36 count three, pictures in GOP3 are additionally supplied as pictures in a GOP temporally preceding the current GOP to the stream buffer 36.

At this time, each picture is read from the recording position in the recording medium 4, preceding over a fixed data amount (data_add) the sixth picture counted from the head of the current GOP through the previous GOP, and additionally supplied to the stream buffer 36. When the stream buffer 36 is in the state t, each picture is read from the recording position in the recording medium 4, preceding over the data amount (data_add) a sixth B picture (number of additional frames in the current GOP) counted from the head of GOP4, and additionally supplied to the stream buffer 36.

The data amount (data_add) may be defined as given by the following expression (2) on the assumption that the number of additional frames in the current GOP is "P" (six in the example shown in FIG. 5), the maximum number of pictures in one GOP is "Max_GOP", picture data amount read per frame time in the normal-speed reproduction mode is "data_1frame" and the data amount in the VBV buffer is "vbv_occupancy":

$$\text{data\_add} = (P + \text{Max\_GOP} - 1) \times \text{data\_1frame} + vbv\_occupancy \quad (2)$$

By starting reading data from a recording position, based on data_add thus determined, in the recording medium 4, a previous GOP can additionally be supplied as additional data to the stream buffer 36.

As above, the stream buffer 36 is supplied, as in a ring buffer, with the acquired previous GOP as auxiliary data in the REVERSE direction from just before the leading picture in the current GOP. When in the state t, the stream buffer 36 is supplied sequentially with GOP3 as additional data F in the REVERSE direction from just before an I picture which is a leading picture in the current GOP, and thus takes the state u.

When the stream buffer 36 is in the state u, the MPEG expander 35 sequentially reads and expand data in the REVERSE direction starting with a B picture corresponding to a remaining third picture indicated with a dotted-line square. The MPEG expander 35 reads the remaining third B picture, indicated with the thick-line square, in the current GOP in the stream buffer 36 that is in the state u first at the recording position, based on the determined data_add, in the recording medium 4, and GOP2 is additionally stored as additional data G into the stream buffer 36 as in a ring buffer. As a result, the stream buffer 36 will take the state v.

Next, when the stream buffer 36 is in the state v, the MPEG expander 35 sequentially reads and expands pictures in the REVERSE direction from a B picture corresponding to the third one of the remaining pictures, indicated with a dotted-line square in FIG. 5. The MPEG expander 35 reads the remaining third B picture, indicated with the thick-line square, in the current GOP in the stream buffer 36 that is in the state u first at the recording position, based on the determined data_add, in the recording medium 4, and GOP0 and GOP1 are additionally stored as additional data H into the stream buffer 36 as in a ring buffer. As a result, the stream buffer 36 will take the state w.

When the stream buffer 36 is in the state w, the two GOPs, that is, GOP0 and GOP1, are additionally stored into the stream buffer 36 since each of these GOPs is small in size. It should be noted that with identification of DTS (decoding time stamp) added to each GOP, the GOPs may be separately stored into the stream buffer 36, whereby it is possible to minimize the data amount for overwrite in the stream buffer 36.

In this connection, when a previous GOP is additionally supplied as additional data to the stream buffer 36, pictures in a GOP temporally preceding the previous GOP, when read from the recording medium 4, are controlled not to flow into the stream buffer 36 so that all pictures in the previous GOP, counted from the head of the previous GOP, will additionally be stored into the stream buffer 36. This control may be done by determining the type of a picture through analysis of a header in the data or based on picture type information added to AUX to locate a GOP head depending on whether the picture type indicates an I picture or by placing a picture flag at the GOP head.

On the assumption that DTS (decoding time stamp) of a leading picture in a current GOP is DTS_c, VBV delay of the leading picture is vbv_delay_c, DTS of the leading picture in a previous GOP is DTS_f and VBV delay of a picture in consideration is vbv_delay_f, the size of additional data can be expressed as given by the following expression (3):

$$\text{Additional data size} = (DTS\_c - vbv\_delay\_c) - (DTS\_f - vbv\_delay\_f) \quad (3)$$

Also, the address (start ADD) in the stream buffer 36, at which the additional data starts being additionally supplied to the stream buffer 36 may be determined as given by the following expression (4) according to an address (current ADD) of the leading picture in the current GOP in the stream buffer 36, size of the additional data and capacity of the sream buffer 36:

$$\text{Start ADD} = (\text{current ADD} - \text{Additional data size} + \text{Capacity of stream buffer 36}) \% \text{ Capacity of stream buffer 36} \quad (4)$$

where % indicates modulo calculation.

Namely, by additionally supplying the additional data to the stream buffer 36 on the basis of a start ADD determined by the expression (4), it is possible to minimize the data amount for overwrite in the stream buffer 36. Thus, also in case the variable-speed reproduction direction is shifted from REVERSE to FORWARD, the MPEG expander 35 can instantaneously read and expand pictures stored in the stream buffer 36 without waiting for additional supply of new pictures to the stream buffer 36, thereby permitting to smoothly cope with various variations in the variable-speed reproduction.

Note that similarly in the REVERSE variable-speed reproduction, when pictures have been stored up to a fixed stream amount, the data read controller 34 informs the recording medium controller 14 of the fact and causes the latter to stop reading of data stream from the recording medium 4.

According to the present invention, additional supply of new data to the stream buffer 36 is repeated to enable smooth shifting of FORWARD normal-speed reproduction being done to REVERSE variable-speed reproduction. Especially, according to the present invention, a predetermined amount of data is additionally supplied to the stream buffer 36 first to a GOP head. That is, an I picture indispensable for expansion of each picture included in the GOP will always be stored at each GOP head in the stream buffer 36. Thus, when the variable-speed reproduction direction is shifted from FORWARD to REVERSE, an I picture in a GOP including pictures to be expanded by the MPEG expander 35 will always exist in the stream buffer 36 at the moment of the reproduction direction shift. Therefore, the MPEG expander 35 instantaneously read and expand pictures stored in the stream buffer 36 without having to wait for additional supply of new data, thereby permitting to smoothly cope with variable variations in the variable-speed reproduction.

Note that the operation made when the normal-speed reproduction is shifted to the REVERSE variable-speed reproduction is not limited to the above-mentioned one. In the above, when the pictures remaining in the current GOP in the stream buffer 36 count three, additional data is supplied to the stream buffer 36. For example, the operation may be such that when the remaining pictures in the stream buffer 36 count M (an arbitrary number), additional data is supplied to the stream buffer 36. In case the stream buffer has a large capacity, M may be set larger for gaining time for supply of additional data for the recording medium 4, whereby a high variable-speed and smooth reproduction can be done.

Also, the number of additional frames for the current GOP is not limited to six. In case the stream buffer has a large capacity, P may be set larger for gaining time for supply of additional data for the recording medium 4, whereby a high variable-speed and smooth reproduction can be done. Also for a variable-speed reproduction, especially, for a high speed reproduction such as double-speed reproduction, the above embodiment can be implemented with appropriate skipping over pictures.

Figure 6:
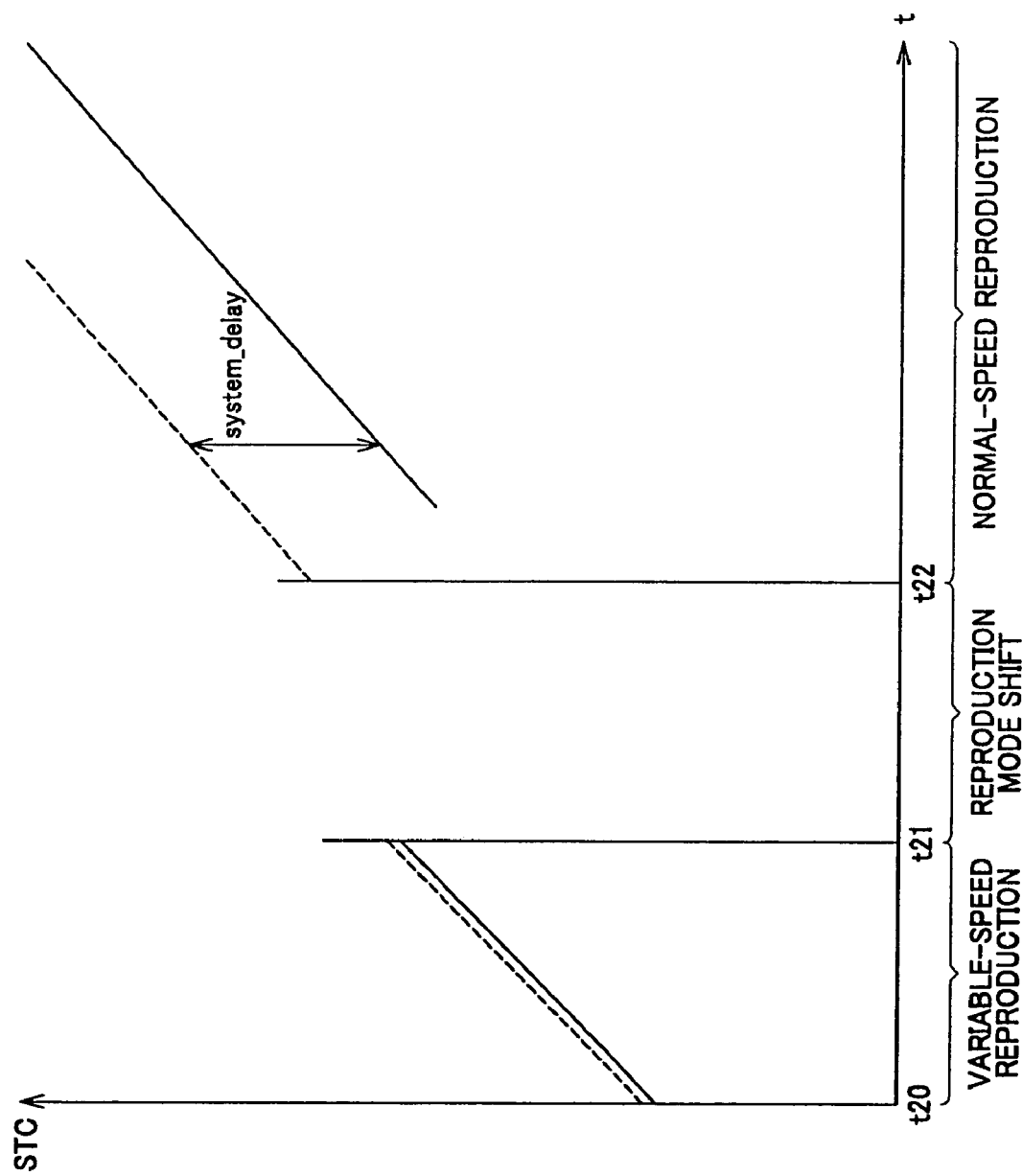
FIG. 6 shows a change of STC at each time when variable-speed reproduction is shifted to normal-speed reproduction.

In case a variable-speed reproduction is shifted to the normal-speed reproduction, the STC set value calculator 40 and STC incrementation unit 41 operate as will be described below:

FIG. 6 shows a change of STC at each time when a variable-speed reproduction is shifted to the normal-speed reproduction. In FIG. 6, the dashed line indicates STC of compressed picture data read from the recording medium 4, and the solid line indicates STC of compressed picture data sent from the data read controller 34 to MPEG expander 35.

In the variable-speed reproduction lasting from a time t20 to t21, the time at which data including an STC is read from the recording medium 4 is generally coincident with the time at which data including the same STC is sent to the MPEG expander 35. Also in a variable-speed reproduction, it is necessary to set an STC initial value in time to STC of picture data read from the recording medium 4 as well as by the STC set value calculator 40. However, it is extremely difficult to set an STC initial value accurately for each speed of a variable-speed reproduction. Also, it is actually difficult in the STC set value calculator 40 and STC incrementation unit 41 to set an STC without any mistiming by even one clock for each speed of a variable-speed reproduction and for no cumulative error. Therefore, in a variable-speed reproduction, all picture data read from the recording medium 4 and stored in the storage unit 33 are supplied as they are to the data read controller 34. In other words, compressed picture data is MPEG-expanded by the leak method.

Next, there will be discussed an operation in which a reproduction is suspended at a time t21 and a normal-speed reproduction is started at a time t22. The time zone from the time t21 to t22 is defined as a "shift time". The STC set value calculator 40 compares PTSs (PTS_s) of pictures currently displayed on the display screen with each other on the basis of STC (STC_medium) in compressed picture data read from the recording medium 4 at the time of shifting, System_delay and a shift-caused delay (Shift_delay), and sets an STC initial value on the basis of the comparison results. More specifically, it sets an STC initial value on the basis of results of comparison between PTS_s and "STC_medium−(shift_delay+System_delay)".

In this connection, shift_delay is a delay caused by a shift from a variable-speed reproduction to a normal-speed reproduction. In case the recording medium 4 is a magnetic tape, the shift_delay corresponds to a time which the magnetic tape speed is controlled to a normal speed. Also, in case the recording medium 4 is a magnetic disk, the shift_delay corresponds to a time required for seek or the like.

Figure 7:
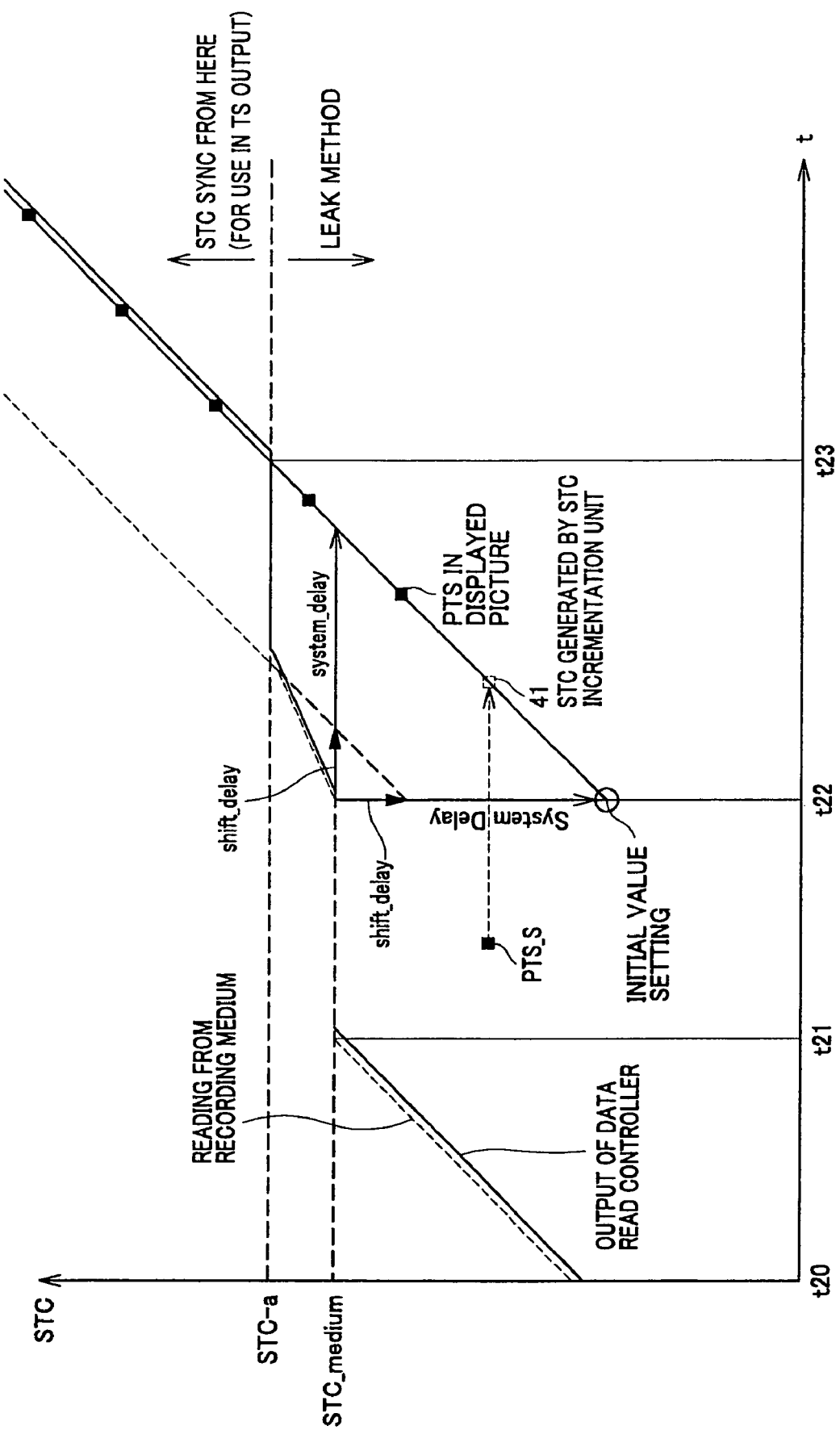
FIG. 7 shows an example setting of STC initial value for normal-speed reproduction.

FIG. 7 shows an example of STC initial value setting for a normal-speed reproduction when the following requirement (5) is met:

$$PTS\_s \geq \{STC\_medium-(shift\_delay+System\_delay)\} \quad (5)$$

In this case, the recording medium controller 34 will shift, at the time t22, data stream reading from the recording medium 4 from that in a variable-speed reproduction to that in a normal-speed reproduction in units of a picture or in units of a GOP (group of pictures). The STC set value calculator 40 sets an STC initial value for the normal-speed reproduction as given by the following expression (6):

$$\text{Initial value}=STC\_medium-(shift\_delay+System\_delay) \quad (6)$$

With this operation, the STC incrementation unit 41 can generate a new STC in the normal-speed reproduction by linearly increasing the STC initial value defined as given by the above expression (6). Also, as shown in FIG. 7, when the normal-speed reproduction is started at the time t22, the STC will be caused by the shift_delay to rise gently. By setting an STC initial value as defined by the expression (6), it is possible to generate an STC at a time delayed the time "System_delay" with consideration given to the shift_delay. Thus, even after shift to the normal-speed reproduction, STC in compressed picture data read from the recording medium 4 can be delayed a fixed time "System_delay".

Also, according to the present invention, while STC generated by the STC incrementation unit 41 for picture data expanded by the MEPG expander 35 is being monitored, a picture whose STC corresponds to an STC included in output time information is displayed. Thus, each of pictures in compressed picture data sent from the data read controller 34 to the MPEG expander 35 can be displayed on the screen in the normal-speed reproduction mode even in a time zone down to t23 at which the reproduction mode is shifted to the normal-speed reproduction delayed a time "System_delay". Therefore, since each picture can be displayed on the screen without skipping over any picture when the reproduction mode is shifted to the normal-speed reproduction and the reproduction mode shift can be done quickly, so the user can actually view a high-quality image.

Note that the TS encoder 45 will not TS-packetize data during any variable-speed reproduction because no temporal synchronization is possible between STC included in STC information sent from the STC incrementation unit 41 and compressed picture data since the leak method is used to supply the compressed picture data. Therefore, the TS encoder 45 will make TS packetizing at STC (STC_a in FIG. 7) at which the reproduction mode is shifted to a normal-speed reproduction and subsequent STCs.

Figure 8:
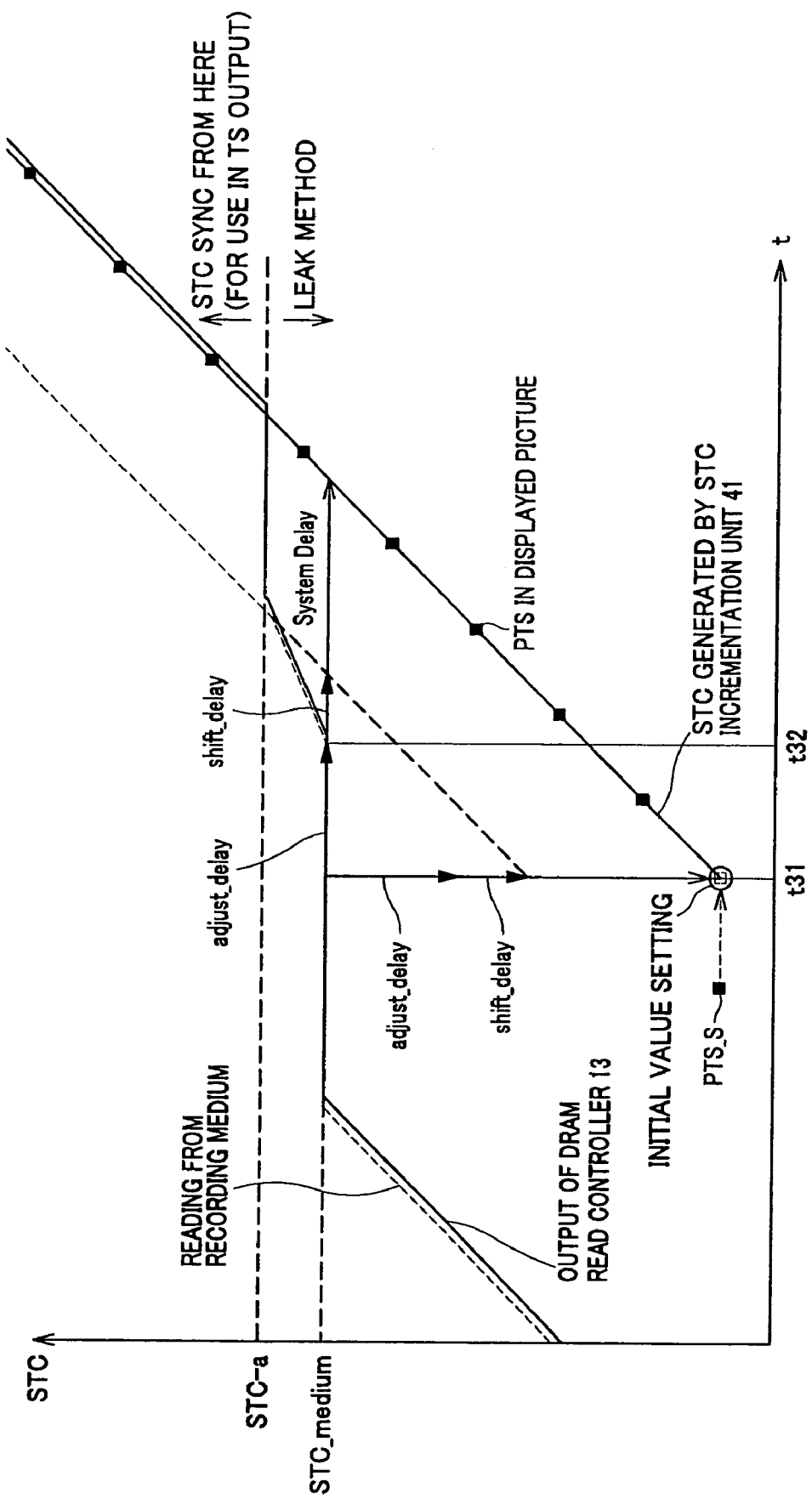
FIG. 8 shows another example setting of STC initial value for normal-speed reproduction.

FIG. 8 shows an example of STC initial value setting for a normal-speed reproduction when the following requirement (7) is met:

$$PTS\_s<\{STC\_medium-(shift\_delay+System\_delay)\} \quad (7)$$

In this example, the STC set value calculator 40 sets an STC initial value in the normal-speed reproduction as PTS_s.

Namely, when the requirement as given by the expression (7) is met, it is necessary to set the above shift_delay and in addition an adjustment value (adjust_delay) for coincidence between PTSs of pictures displayed on the screen in a variable-speed reproduction. The adjustment value can be represented by the following expression (8):

$$adjust\_delay=(STC\_medium-PTS\_s)-(shift\_delay+System\_delay) \quad (8)$$

In this case, the recording medium controller 34 will shift, at a time delayed a time "adjust_delay", data stream reading from the recording medium 4 from that in a variable-speed reproduction to that in a normal-speed reproduction in units of a picture or in units of a GOP (group of pictures). Also, the STC incrementation unit 41 can generate a new STC in the normal-speed reproduction by linearly increasing the STC initial value defined as PTS_s. In case the requirement (7) is met, when the normal-speed reproduction is started at the time t31 in FIG. 8, the STC will be caused by the shift_delay to rise gently and a further adjust_delay will take place. However, the STC incrementation unit 41 can generate STC with consideration given to such a delay. Thus, even after shift to the normal-speed reproduction, STC in compressed picture data read from the recording medium 4 can be delayed a fixed time "System_delay".

Also in case the requirement (7) is met, while STC generated by the STC incrementation unit 41 for picture data expanded by the MPEG expander 35 is being monitored, a picture whose STC corresponds to an STC included in output time information is displayed. Thus, each of pictures in compressed picture data sent from the data read controller 34 to the MPEG expander 35 can be displayed on the screen in the normal-speed reproduction mode also in a time zone down to t32 at which the reproduction mode is shifted to the normal-speed reproduction delayed a time "System_delay". Therefore, since each picture can be displayed on the screen without skipping over any picture when the reproduction mode is shifted to the normal-speed reproduction and the reproduction mode shift can be done quickly, so the user can actually view a high-quality image.

Note that even in case the requirement (7) is met, the TS encoder 45 will not TS-packetize data during any variable-speed reproduction because no temporal synchronization is possible between STC included in STC information sent from the STC incrementation unit 41 and compressed picture data since the leak method is used to supply the compressed picture data. Therefore, the TS encoder 45 will make TS packetizing at STC (STC_a in FIG. 8) at which the reproduction mode is shifted to a normal-speed reproduction and subsequent STCs.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

When the reproduction mode is shifted from a variable-speed one to a normal-speed one in compliance with the MPEG standard, an image reproduced by a normal-speed reproduction can smoothly be displayed without skipping over any displayed images.

What is claimed is:

1. A picture data reproducing apparatus which reproduces compressed picture data recorded to a recording medium according the MPEG standard, the apparatus comprising:
   a storage means for storing compressed picture data read from a recording medium;
   an STC generating means for generating, for a normal-speed reproduction, STC (STC_d) sequentially from a set initial value, wherein the STC (STC_d) is delayed a fixed time (System_delay) from STC (STC_medium) of the compressed picture data read from the recording medium;
   a read control means for sequentially reading compressed picture data stored in the storage means on the basis of STC_d generated by the STC generating means; and
   a decoding means for decoding the compressed picture data read by the read control means to generate picture data for display;
   the STC generating means setting, at shift from a variable-speed reproduction to normal-speed reproduction, the initial value on the basis of a result of comparison between PTS (PTS_s) of the display picture data at the shift and STC_medium at the shift−(amount of delay due to the shift (shift_delay)+System_delay).

2. The apparatus as set forth in claim 1, wherein the STC generating means sets the initial value as "STC_medium at the time of shift−(shift_delay+System_delay)" at the shift from the variable-speed reproduction to normal-speed reproduction when the following requirement is met:

$$PTS\_s \geq \{STC\_\text{medium at the time of shift} - (\text{shift\_delay} + \text{System\_delay})\}.$$

3. The apparatus as set forth in claim 2, further comprising a shifting means for shifting the recording medium reproduction mode from the variable-speed reproduction to normal-speed reproduction at a time set as the initial value by the STC generating means in units of a picture or in units of a GOP (group of pictures).

4. The apparatus as set forth in claim 1, wherein the STC generating means sets the initial value as PTS_s at the shift from the variable-speed reproduction to normal-speed reproduction when the following requirement is met:

$$PTS\_s < \{STC\_\text{medium at the time of shift} - (\text{shift\_delay} + \text{System\_delay})\}.$$

5. The apparatus as set forth in claim 4, further comprising a shifting means for shifting the recording medium reproduction mode from the variable-speed reproduction to normal-speed reproduction in units of a picture or in units of a GOP (group of pictures) at a time delayed a time "adjust_delay" defined as given below from a time when the STC generating means sets the initial value:

Delay time (adjust_delay)=(STC_medium at the shift−PTS_s)−(shift delay+System_delay).

6. The apparatus as set forth in claim 1, further comprising a TS packetizing means for TS-packetizing of only compressed picture data to be reproduced in the normal-speed reproduction mode.

7. A picture data reproducing method of reproducing compressed picture data recorded to a recording medium according the MPEG standard, the method comprising the steps of:
   storing compressed picture data read from a recording medium;
   generating, for a normal-speed reproduction, STC (STC_d) sequentially from a set initial value, wherein the STC (STC_d) is delayed a fixed time (System_delay) from STC (STC_medium) of the compressed picture data read from the recording medium;
   sequentially reading compressed picture data stored in the storage means correspondingly STC_d generated by the STC generating means; and
   decoding the compressed picture data read by the read control means to generate picture data for display;
   in the STC generating step, the initial value being set at shift from a variable-speed reproduction to normal-speed reproduction on the basis of a result of comparison between PTS (PTS_s) of the display picture data at the shift and STC_medium−(amount of delay due to the shift (shift_delay)+System_delay).

8. The method as set forth in claim 7, wherein in the STC generating step, there is set the initial value as "STC_medium at the time of shift−(shift_delay+System_delay)" at the shift from the variable-speed reproduction to normal-speed reproduction when the following requirement is met:

$$PTS\_s \geq \{STC\_\text{medium at the time of shift} - (\text{shift\_delay} + \text{System\_delay})\}.$$

9. The method as set forth in claim 8, further comprising a shifting step of shifting the recording medium reproduction mode from the variable-speed reproduction to normal-speed reproduction at a time set as the initial value in the STC generating step in units of a picture or in units of a GOP (group of pictures).

10. The method as set forth in claim 7, wherein in the STC generating step, there is set the initial value as PTS_s at the shift from the variable-speed reproduction to normal-speed reproduction when the following requirement is met:

$$PTS\_s < \{STC\_\text{medium at the time of shift} - (\text{shift\_delay} + \text{System\_delay})\}.$$

11. The method as set forth in claim 10, further comprising a shifting step of shifting the recording medium reproduction mode from the variable-speed reproduction to normal-speed reproduction in units of a picture or in units of a GOP (group of pictures) at a time delayed a time "adjust_delay" defined as given below from a time when in the STC generating step, there is set the initial value:

Delay time (adjust_delay)=(STC_medium at the shift−PTS_s)(shift delay+System_delay).

12. The method as set forth in claim 7, further comprising a TS packetizing step of TS-packetizing of only compressed picture data to be reproduced in the normal-speed reproduction mode.

* * * * *